(No Model.) 2 Sheets—Sheet 1.
C. M. CONRADSON.
ELECTRIC STREET CAR DRIVING GEAR.
No. 448,910. Patented Mar. 24, 1891.
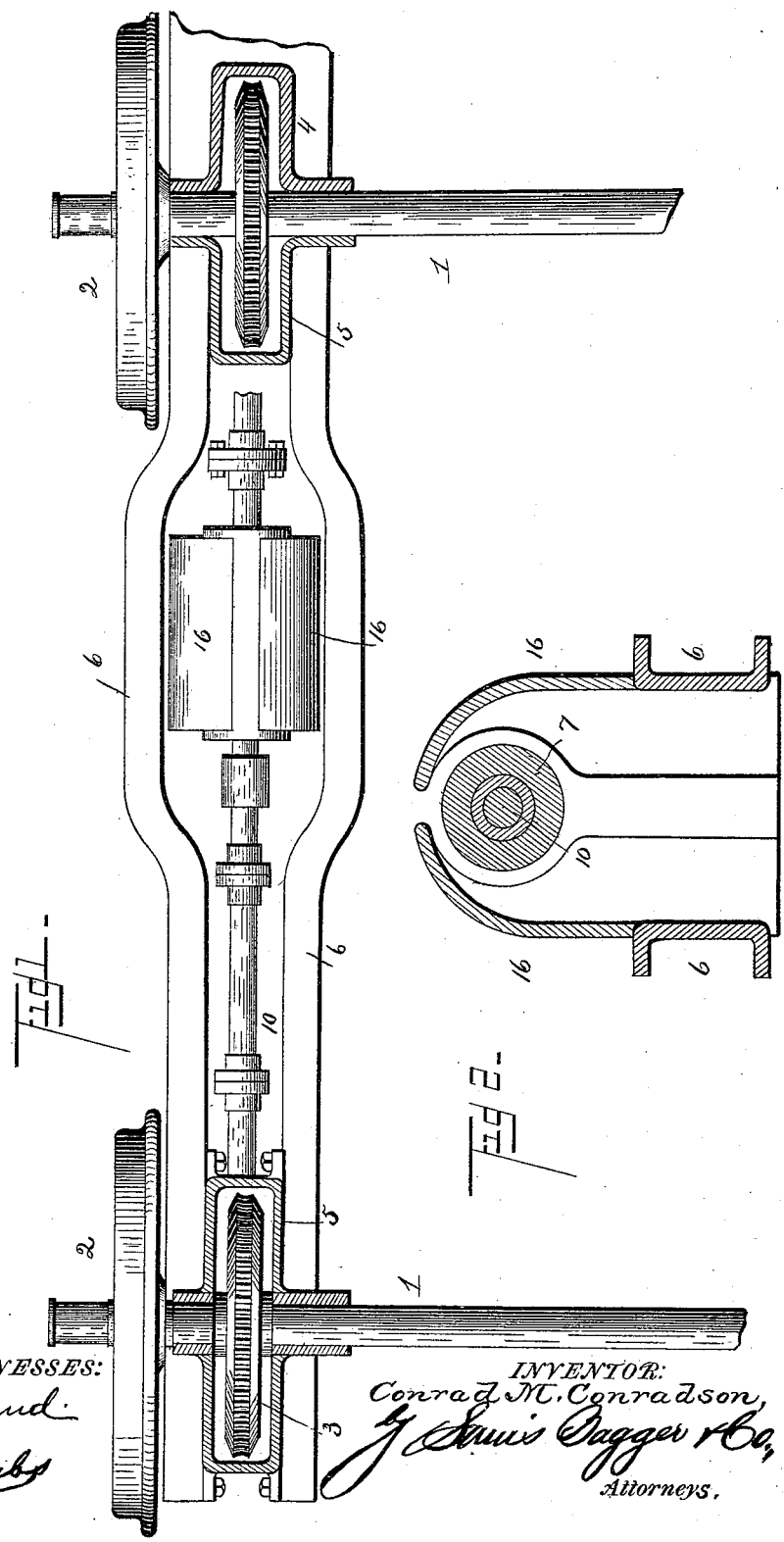
WITNESSES:
F. L. Ourand
W. L. Coombs
INVENTOR:
Conrad M. Conradson
G. Lewis Bagger & Co.,
Attorneys.

(No Model.) 2 Sheets—Sheet 2.
C. M. CONRADSON.
ELECTRIC STREET CAR DRIVING GEAR.
No. 448,910. Patented Mar. 24, 1891.
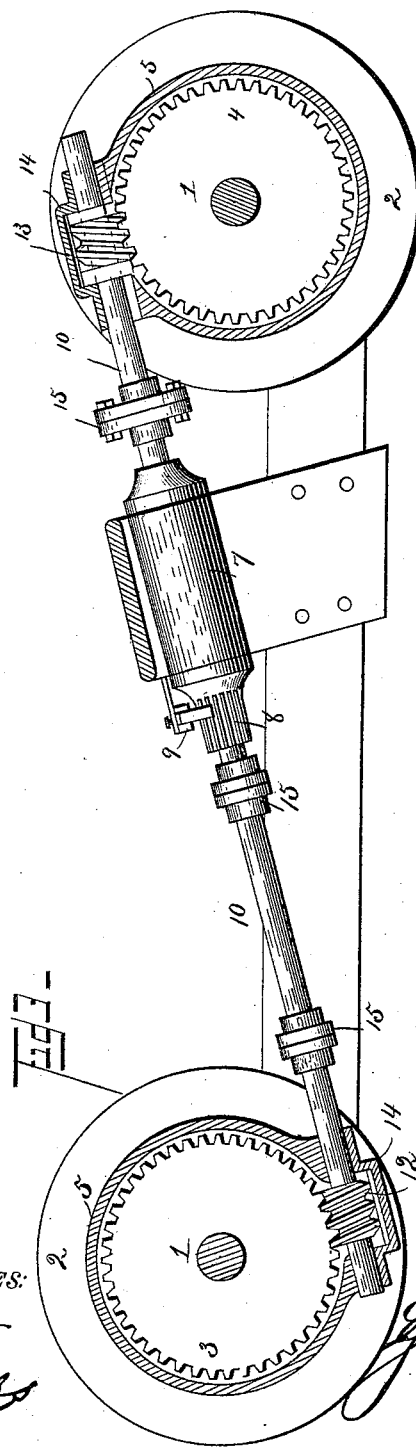
WITNESSES:
F. L. Ourand
H. L. Coombs
INVENTOR:
Conrad M. Conradson
J. Sivus Bagger & Co,
Attorneys.

UNITED STATES PATENT OFFICE.

CONRAD M. CONRADSON, OF MADISON, WISCONSIN.

ELECTRIC STREET-CAR DRIVING-GEAR.

SPECIFICATION forming part of Letters Patent No. 448,910, dated March 24, 1891.

Application filed December 3, 1890. Serial No. 373,451. (No model.)

*To all whom it may concern:*

Be it known that I, CONRAD M. CONRADSON, a citizen of the United States, and a resident of Madison, in the county of Dane and State of Wisconsin, have invented certain new and useful Improvements in Electric Street-Car Driving-Gears; and I do hereby declare that the following is a full, clear, and exact description of the invention, which will enable others skilled in the art to which it appertains to make and use the same, reference being had to the accompanying drawings, which form a part of this specification.

My invention relates to improvements in electric street-car driving-gear.

Electric motors for car propulsion as now generally constructed are open to serious objections, the most serious defects being the noise when working and the rapidity with which they wear out. They also generally require the employment of two motors to each car to render their action efficient.

The object of my invention is to provide an improved construction of driving-gear, whereby the above objections are obviated and a very economical, durable, and efficient device or apparatus provided.

The invention consists, essentially, in the combination, with the driving-axles of a car or other vehicle, of an electric motor located intermediate of the axles and having the armature-shaft inclined and each end provided with gears which mesh with gears mounted upon the axle, said gears on the armature-shaft being located, respectively, above and below the center of the axles, as will hereinafter more fully appear.

It also consists in other novel features of construction and sub-combinations of parts hereinafter fully described, and definitely pointed out in the claim.

In the accompanying drawings, Figure 1 is a plan view of the running-gear of a street-railroad car with my improvements applied thereto. Fig. 2 is a longitudinal sectional view of the same. Fig. 3 is a section on the line *x x*, Fig. 1.

In the said drawings, the reference-numeral 1 designates the car-axles, and 2 the wheels, which may be of any ordinary construction. Firmly secured to the axles are worm-gears 3 and 4, each of which is surrounded by a casing 5, through which the axles pass. To these casings, at each side, are firmly bolted or otherwise secured the longitudinal channel-bars 6, which carry the motor 7. This motor may be of any ordinary construction, and is provided with the usual commutator 8 and brushes 9, and may also be provided with a switch (not shown) for reversing the electric current in order to change the direction of rotation of the armature. This motor is secured upon said channel-bars, so that the armature-shaft 10 is in an inclined position, as seen more clearly in Fig. 2. At each end said shaft is provided with a worm 12 and 13, which are arranged oppositely to each other, and which engage, respectively, with the gears 3 and 4. The ends of the said shaft are journaled in extensions 14 of the casing 5, which also form oil-chambers. For the purpose of allowing the armature to be readily removed for repairs or other purposes, I make the same in removable sections, and couple the same together by means of the couplings 15 intermediate of the ends thereof and the motor, by removing which the armature can also be removed. The motor is inclosed by a casing 16, connected with the channel-bars.

The operation will be readily understood. As the armature is rotated the shaft 10 will be revolved, causing a similar motion to be imparted to the worms thereon. As will be seen, these worms work in different directions; but by reason of their engaging with the gears in the axles on opposite sides thereof the axles and wheels will be rotated in the same direction. It will thus be seen that the thrust of one worm is opposite to that of the other, which tends to equalize the strain upon the motor, and thus prevent injury to the same, which would not be the case were the thrusts in the same direction.

By the above construction a highly efficient apparatus is produced. The armature-shaft can be readily disconnected and the armature removed. The working parts are protected from dust and dirt, and the apparatus is noiseless in working, because the worm-gearing engages gradually and is always in contact at the pitch point.

Having thus described my invention, what I claim is—

In an electric car, the combination, with the axles having worm-gears mounted thereon, said gears being provided with surrounding casings journaled on the axles and having extensions on which the ends of the armature-shaft are journaled, of the channel-bars connecting said casings, and an electric motor mounted on said channel-bars in an inclined position, the inclined armature-shaft having oppositely-acting worms at each end engaging with the worm-gears at points above and below the axles, respectively, substantially as described.

In testimony that I claim the foregoing as my own I have hereunto affixed my signature in presence of two witnesses.

CONRAD M. CONRADSON.

Witnesses:
  J. HOGAN,
  W. H. EAVES.